United States Patent
Czapka et al.

(12)

(10) Patent No.: US 10,736,255 B2
(45) Date of Patent: *Aug. 11, 2020

(54) SYSTEM AND METHOD FOR LEVELING AN AGRICULTURAL IMPLEMENT

(71) Applicant: CNH Industrial America LLC, New Holland, PA (US)

(72) Inventors: Jason Czapka, Munster, IN (US); Keith Walter Wendte, Willowbrook, IL (US)

(73) Assignee: CNH Industrial America LLC, New Holland, PA (US)

(*) Notice: Subject to any disclaimer, the term of this patent is extended or adjusted under 35 U.S.C. 154(b) by 205 days.

This patent is subject to a terminal disclaimer.

(21) Appl. No.: 15/907,806

(22) Filed: Feb. 28, 2018

(65) Prior Publication Data

US 2018/0184571 A1 Jul. 5, 2018

Related U.S. Application Data

(63) Continuation of application No. 15/183,047, filed on Jun. 15, 2016, now Pat. No. 9,980,422.

(51) Int. Cl.
*A01B 63/14* (2006.01)
*A01B 59/042* (2006.01)
*A01B 63/22* (2006.01)
*A01B 59/041* (2006.01)

(52) U.S. Cl.
CPC .......... *A01B 63/14* (2013.01); *A01B 59/042* (2013.01); *A01B 63/22* (2013.01); *A01B 59/0415* (2013.01)

(58) Field of Classification Search
CPC . A01B 59/041; A01B 59/0415; A01B 59/042; A01B 63/14

USPC .................................................. 172/2, 4, 7
See application file for complete search history.

(56) References Cited

U.S. PATENT DOCUMENTS

| 2,747,884 A | 5/1956 | De Vilder |
| 3,912,017 A | 10/1975 | Rehn |
| 4,337,959 A | 7/1982 | Bettin et al. |
| 4,340,128 A | 7/1982 | Yamaue et al. |

(Continued)

OTHER PUBLICATIONS

Wehrspann, J; "New Tractor Cabs: The Lastest in Creature Comforts;" TractorLife.com, 2012.

*Primary Examiner* — Gary S Hartmann
(74) *Attorney, Agent, or Firm* — Rebecca L. Henkel; Rickard K. DeMille

(57) ABSTRACT

A system includes an agricultural implement, a sensor, and a control system. The agricultural implement is configured to be coupled to an agricultural vehicle. The sensor is coupled to the agricultural implement and configured to output a signal indicative of a current pitch angle of the agricultural implement. The control system is configured to receive the signal indicative of the current pitch angle from the sensor, determine an anticipated pitch angle for traversing an upcoming topographical feature, define an anticipated pitch angle range based on the anticipated pitch angle, determine whether the current pitch angle is within the anticipated pitch angle range, generate a hitch height control signal indicative of instructions to predictively adjust a hitch height actuator if the current pitch angle is not within the anticipated pitch angle range, and communicate the hitch height control signal.

17 Claims, 7 Drawing Sheets

(56) References Cited

U.S. PATENT DOCUMENTS

| | | | |
|---|---|---|---|
| 4,712,622 | A | 12/1987 | Birkenbach et al. |
| 5,178,402 | A | 1/1993 | Love et al. |
| 5,551,518 | A | 9/1996 | Stratton |
| 5,992,535 | A | 11/1999 | Bierl et al. |
| 6,119,786 | A * | 9/2000 | Creger ............... A01B 63/1115 172/7 |
| 6,547,012 | B2 | 4/2003 | Scarlett et al. |
| 6,698,523 | B2 | 3/2004 | Barber |
| 7,461,712 | B2 | 12/2008 | Law et al. |
| 8,235,130 | B2 | 8/2012 | Henry et al. |
| 9,930,834 | B2 * | 4/2018 | Chaney ................ A01F 15/08 |
| 9,980,422 | B2 * | 5/2018 | Czapka ................ A01B 63/22 |
| 2013/0004282 | A1 | 1/2013 | Grimes et al. |
| 2013/0068489 | A1 | 3/2013 | Blunier et al. |
| 2013/0081828 | A1 | 4/2013 | Tuttle et al. |
| 2013/0081830 | A1 | 4/2013 | Tuttle et al. |
| 2015/0156950 | A1 | 6/2015 | Henry |
| 2018/0228075 | A1* | 8/2018 | Czapka ................ A01B 63/22 |

\* cited by examiner

SYSTEM AND METHOD FOR LEVELING AN AGRICULTURAL IMPLEMENT

CROSS REFERENCE TO RELATED APPLICATIONS

This application is a continuation of U.S. Non-Provisional patent application Ser. No. 15/183,047, entitled "SYSTEM AND METHOD FOR LEVELING AN AGRICULTURAL IMPLEMENT," filed Jun. 15, 2016, which is hereby incorporated by reference in its entirety.

BACKGROUND

The present disclosure relates generally to agricultural implements, and more specifically to leveling an agricultural implement coupled to an agricultural vehicle.

An agricultural implement may be coupled to a tractor or other agricultural vehicle to perform an agricultural task (e.g., tilling, planting, seeding, spraying, fertilizing, harvesting, etc.). The implement may be towed behind the tractor or mounted to the tractor. During the performance of an agricultural task, the implement may tilt relative to the field, resulting in poor performance and reduced efficiency.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a system includes an agricultural implement, a sensor, and a control system. The agricultural implement is configured to be coupled to an agricultural vehicle. The sensor is coupled to the agricultural implement and configured to output a signal indicative of an implement pitch angle of the agricultural implement. The control system is configured to receive the signal indicative of the implement pitch angle from the sensor, determine whether the pitch angle is within a pitch angle range, generate a hitch height control signal indicative of instructions to adjust a hitch actuator if the pitch angle is not within the pitch angle range, and communicate the hitch height control signal.

In a second embodiment, a system includes an agricultural vehicle including a hitch, a hitch actuator, an agricultural implement, and a control system. The agricultural implement is coupled to the agricultural vehicle via the hitch, wherein the agricultural implement comprises a sensor configured to output a signal indicative of an implement pitch angle of the agricultural implement. The control system is configured to receive the signal indicative of the implement pitch angle from the sensor, determine whether the pitch angle is within a pitch angle range, generate a hitch height control signal indicative of instructions to adjust the hitch actuator if the pitch angle is not within the pitch angle range, and communicate the hitch height control signal to the hitch actuator.

In a third embodiment, a method includes receiving a signal indicative of an implement pitch angle from a sensor, determining whether the pitch angle is within a pitch angle range, generating a hitch height control signal indicative of instructions to adjust a hitch actuator if the pitch angle is not within the pitch angle range, and communicating the hitch height control signal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A tractor may tow or support an implement and move the implement through a field to perform and agricultural task. For some agricultural tasks, the results and/or efficiency of the task may be improved when the implement is maintained in a level orientation (e.g., at a zero pitch angle relative to the field) or at a desired pitch angle relative to the field during performance of the agricultural task. Typically, the implement pitch angle is manually adjusted by the operator (e.g., prior to initialization of the task and/or periodically throughout the task). However, the implement pitch may drift out of the desired implement pitch angle range (e.g., as a result of changing field conditions and/or a reduction in the load carried by the implement 12 as product is distributed throughout the field). By utilizing a communication link that enables the implement to provide control signals to the tractor and an inclinometer coupled to the implement, a height of the tractor hitch may be adjusted, thereby maintaining the implement at a desired pitch angle during performance of the agricultural task. The implement may be coupled to the tractor via a fully mounted configuration, a semi-mounted configuration, or via a scissor hitch.

Figure 1:
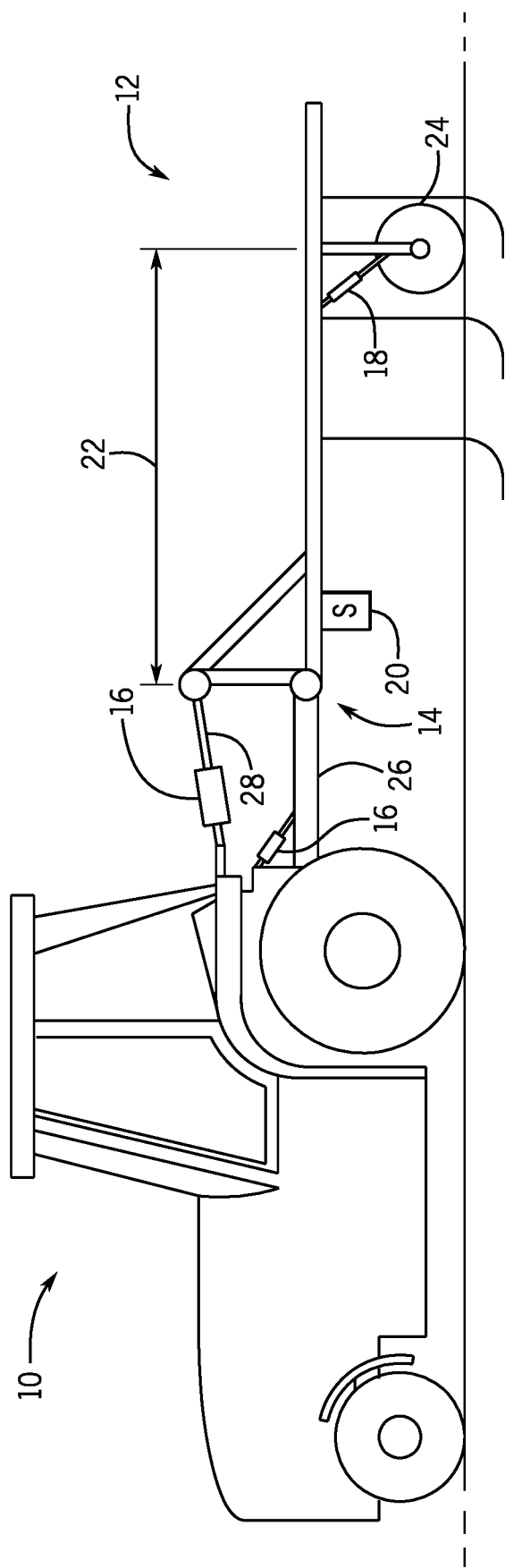
FIG. 1 is a schematic side view of one embodiment of an implement coupled to an agricultural vehicle in a fully mounted configuration.

FIG. 1 is a schematic side view of an embodiment of an implement 12 coupled to an agricultural vehicle 10 in a fully mounted configuration. Though the embodiment shown in FIG. 1 includes an agricultural vehicle, such as the illustrated tractor 10, coupled to an implement 12, it should be understood that some embodiments may include multiple implements 12. Both the tractor 10 and the implement 12 may be ISOBUS Class 3 compliant, or may communicate with one another via some other communication protocol. The implement 12 may be a raker, tillage implement, mower, planter, seeder, harvester, or any other suitable implement. In the illustrated embodiment, the implement 12 is coupled to the tractor 10 by a hitch 14 (e.g., a three-point hitch) in a fully-mounted configuration. In other embodiments, the implement 12 may be mounted directly to the vehicle 10, rather than towed behind the vehicle 10 via the hitch 14. In the illustrated embodiment, the hitch 14 is a three-point hitch, however, in other embodiments, the hitch 14 may be a 2-point hitch, a drawbar hitch, a scissor hitch, or any other suitable type of hitch. The tractor 10 may include one or more actuators (e.g., cylinder 16) that control the tilt of the hitch 14, or the position of the hitch links. Similarly, the towed implement 12 may include one or more actuators (e.g., cylinder 18) that control a height of a portion of the implement 12. Each of the actuators 16, 18 may be controlled via a hydraulic valve assembly (see FIG. 5) on the tractor 10, in fluid communication with the actuators 16, 18 via a series of hydraulic lines. The implement 12 also includes a sensor (e.g., inclinometer 20) to determine a pitch angle and/or height of the implement 12. Based on a distance 22 between the hitch 14 and the gauge wheels 24 (or other ground-engaging component), the actuators 16, 18 may be adjusted to achieve a desired implement 12 height and pitch angle. As described in more detail below, the implement 12 controller or control system may use the sensor (e.g., inclinometer 20) to determine the height and/or pitch angle of the implement 12. If the height and/or pitch angle of the implement 12 are not at the desired height or pitch angle, the implement 12 may then automatically request (e.g., via ISOBUS Class 3 communication with the tractor 10) that the tractor 10 controller or control system adjust the height of the hitch 14 and/or the implement 12 via the one or more actuators 16, 18.

As shown, the three-point hitch 14 includes two lower links 26 and one upper link 28, each having actuators 16 for adjusting the position of the links 26, 28. The implement 12 is coupled to the hitch 14 in a fully mounted configuration, meaning that the implement is coupled to the lower links 26 and the upper link 28. Extending or contracting the hitch actuators 16 may change the position of the links 26, 28, thereby controlling the hitch 14 height, the height of the implement 12, and/or the pitch angle of the implement 12. Typically, the lower links 26 are used to control the depth of the implement using the tractor's built in hydraulic cylinders 16, however, the implement may be equipped with a manual or hydraulically controlled gauge wheel 24 and one or more actuators 18 to control the depth of the implement 12.

Figure 2:
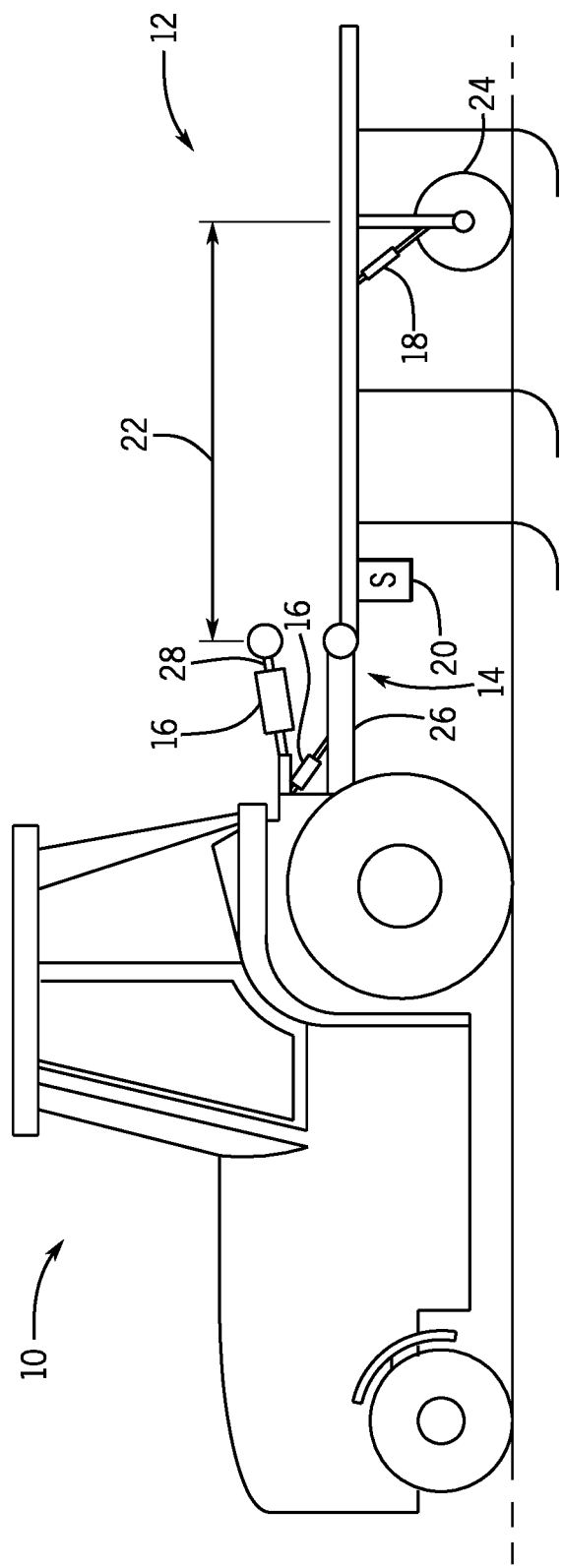
FIG. 2 is a schematic side view of one embodiment of the implement coupled to the agricultural vehicle in a semi-mounted configuration.

FIG. 2 is a schematic side view of one embodiment of the implement 12 coupled to the agricultural vehicle 10 in a semi-mounted configuration. As illustrated, the implement 12 is coupled to the two lower links 26 of the three-point hitch 14, but not the top link 28. In a semi-mounted configuration, lower links 26 may be articulated using the one or more actuators 16 along with carrying wheel 24 and actuator 18 to control hitch height and implement 12 pitch angle. The implement 12 controller or control system may use the sensor (e.g., inclinometer 20) to determine the height and/or pitch angle of the implement 12. Based on the distance 22 between the hitch 14 and the gauge wheels 24 (or other ground-engaging component), the actuators 16, 18 may be adjusted to achieve a desired implement 12 height and pitch angle.

Figure 3:
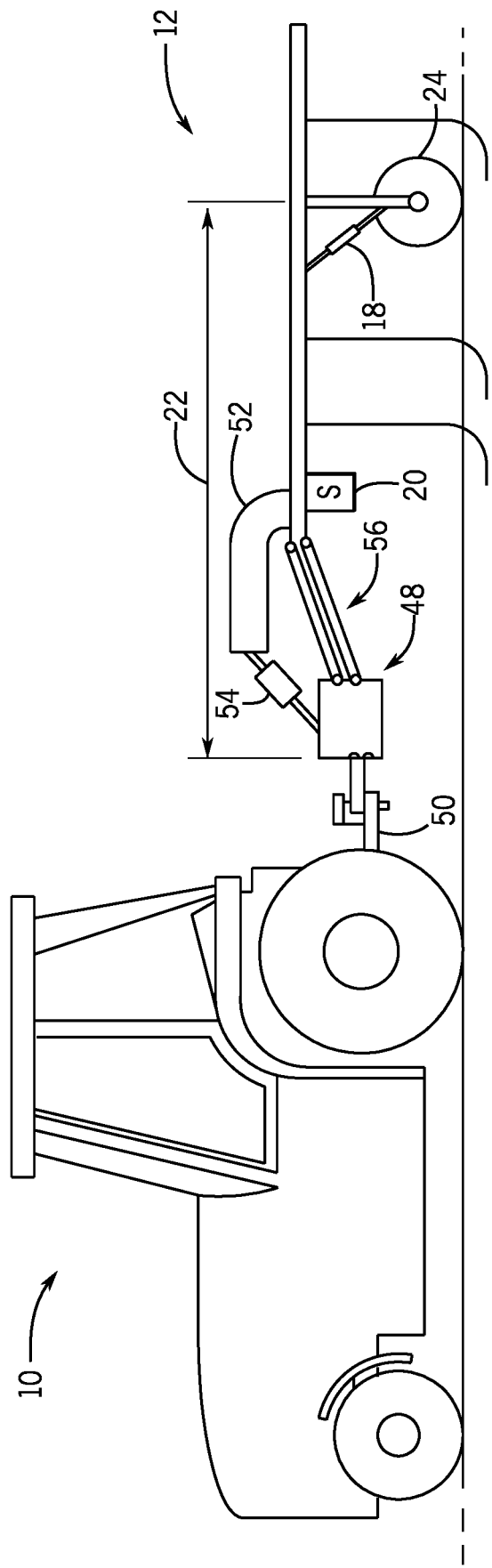
FIG. 3 is a schematic side view of one embodiment of the implement coupled to the agricultural vehicle via a scissor hitch.

FIG. 3 is a schematic side view of one embodiment of the implement 12 coupled to the agricultural vehicle 10 via a scissor hitch 48. In the scissor hitch configuration, the implement 12 couples to the vehicle 10 via a fixed drawbar 50 and a pin. In the illustrated embodiment, the vehicle 10 may or may not have a three-point hitch in addition to the fixed drawbar 50. Unlike the previously discussed embodiments, the fixed drawbar 50 has a fixed position relative to the vehicle 10 and may not include any actuators. The scissor hitch 48 includes an arm 52 and an actuator 54 (e.g., a cylinder). As the actuator 54 extends or contracts, one or more links 56 coupling the implement 12 to the hitch 48, moving the arm 52 relative to the rest of the hitch 48, resulting in an adjustment in implement height and pitch angle. As with the previously described embodiments, the implement 12 height and pitch angle may be adjusted using the actuators 18, 54. The implement 12 controller or control system may use the sensor (e.g., inclinometer 20) to determine the height and/or pitch angle of the implement 12. Based on the distance 22 between the fixed drawbar 50 and the gauge wheels 24 (or other ground-engaging component), the actuators 18, 54 may be adjusted to achieve a desired implement 12 height and pitch angle.

Figure 4:
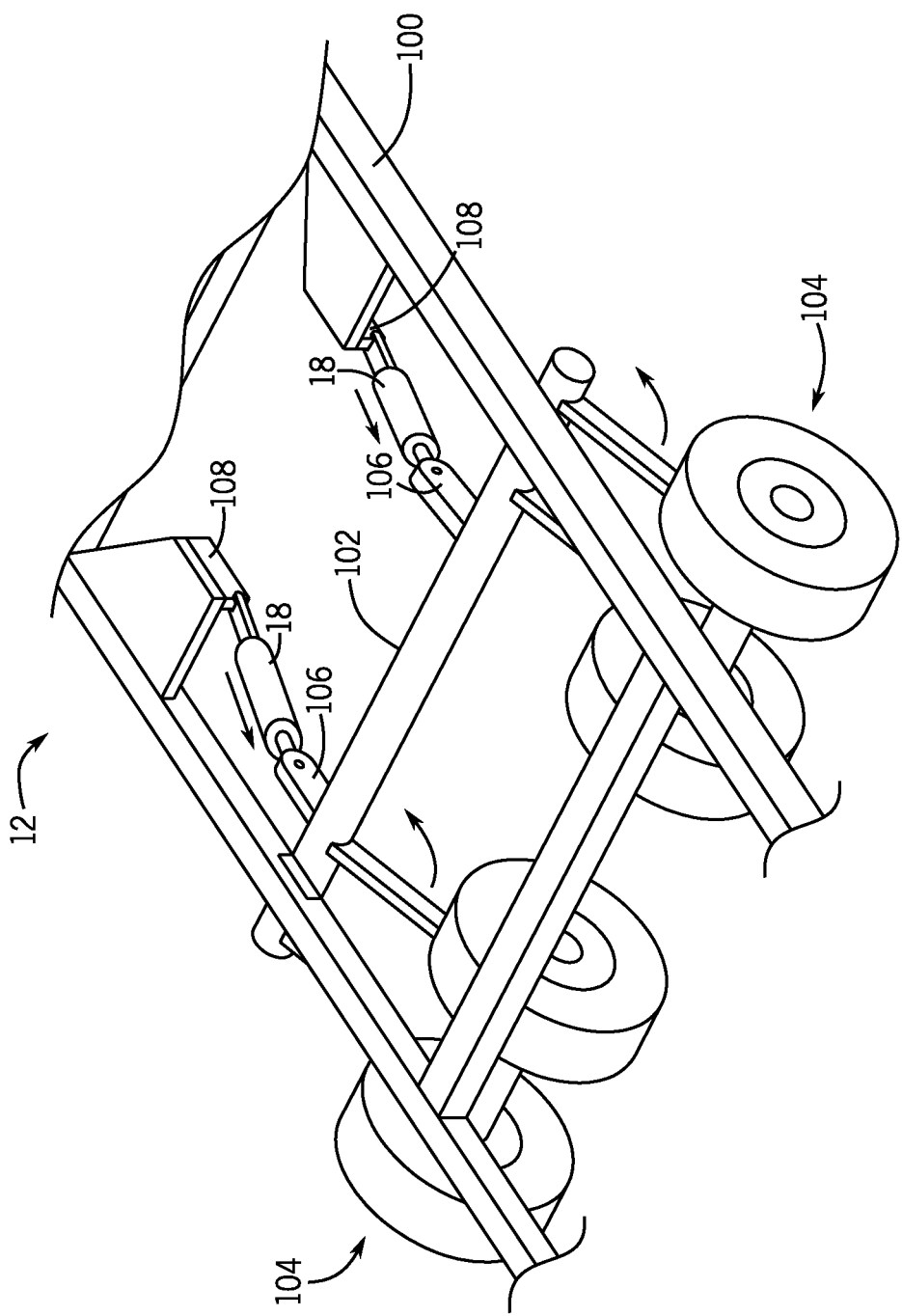
FIG. 4 is a perspective view of one embodiment of an implement that may be coupled to the agricultural vehicle of FIG. 1.

FIG. 4 is a perspective view of one embodiment of an implement 12 that may be coupled to the tractor 10 of FIGS. 1-3. In the illustrated embodiment, the implement 12 includes an implement frame 100. A rockshaft 102 extends across the implement frame 100. The rockshaft 102 may be supported by bearings at either lateral end, which enable the rockshaft 102 to rotate relative to the implement frame 100. Pivoting wheel assemblies 104 are coupled to the rockshaft 102. Thus, as the rockshaft 102 rotates, the wheel assemblies 104 raise and lower relative to the implement frame 100, thereby adjusting the height of the frame at the rockshaft 102 relative to the field. Actuators (e.g., cylinders 18) are coupled between brackets 106 on the rockshaft 102 and brackets 108 on the implement frame 100 such that as the cylinders 18 extend, the wheel assemblies 104 pivot downwardly, raising the height of the frame 100 at the rockshaft 102. Similarly, when the cylinders 18 retract, the wheel assemblies 104 pivot upwardly, lowering the height of the implement 12 frame 100 at the rockshaft 102. The cylinders 18 on the implement 12 may be used in cooperation with the hitch cylinders 16, 54 to adjust the pitch angle and/or the height of the implement 12.

Though the implement 12 shown in FIG. 4 has two wheel assemblies 104 and two cylinders 18, it should be understood that that implement 12 is merely an example and that the implement 12 may have a different number of wheel assemblies 104 and cylinders 18. For example, the implement 12 may have a central frame with two or more cylinders 108 and wheel assemblies 104, as well as one or more wing frames on either side, each having additional cylinders 18 and wheel assemblies 104. In some embodiments, the implement 12 may include multiple rows of wheel assemblies 104, such that cylinders 18 for different rows of wheel assemblies 104 may be set to different positions to control the height and pitch angle of the implement frame 100. The wheel assemblies 104 may also be arranged in locations other than those shown in FIG. 4. Similarly, the implement 12 may utilize other types of wheel assemblies 104 than those shown, or may utilize other types of actuators in place of the cylinders 18. Indeed, the implement 12 may include other systems for controlling the height of the implement 12 beyond the rockshaft 102 system shown in FIG. 4.

Additionally, some embodiments may include "carried" implements that do not have wheel assemblies. In such embodiments, the implement height 300 may be adjusted by a cylinder and linkage coupled to the hitch.

Figure 5:
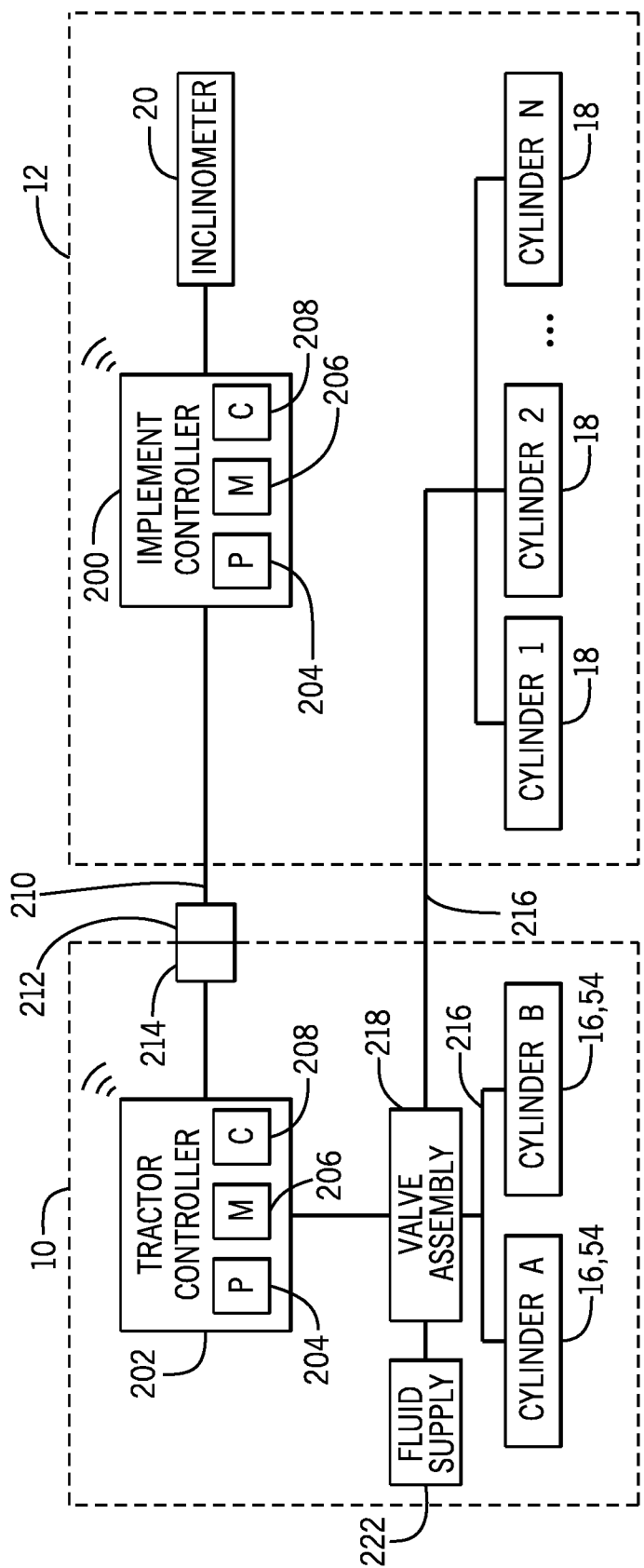
FIG. 5 is a schematic view of one embodiment of an implement controller and tractor controller in communication with one another.

FIG. 5 is a schematic view of one embodiment of an implement controller 200 (e.g., ECU) and a tractor controller 202 (e.g., ECU), which may be collectively referred to as a control system, in communication with one another. Each of the illustrated implement controller 200 and the tractor controller 202 include a processor 204, a memory component 206, and communication circuitry 208. Each processor 204 may include one or more general-purpose processors, one or more application specific integrated circuits, one or more field programmable gate arrays, or the like. Each memory component 206 may be any tangible, non-transitory, computer readable medium that is capable of storing instructions executable by the respective processor 204 and/or data that may be processed by the respective processor 204. In other words, the memory 206 may include volatile memory, such as random access memory, or non-volatile memory, such as hard disk drives, read-only memory, optical disks, flash memory, and the like. The communication circuitry 208 may be configured to receive inputs (e.g., from the other controller 200, 202, the inclinometer 20, other sensors, etc.) and to transmit outputs (e.g., control signals, command signals, etc.) to the various components of the system (e.g., valve assemblies, the other controller 200, 202, etc.).

The tractor controller 202 may be communicatively coupled to a valve assembly 218 and fluid supply 222 on the tractor. Based on control signals from the tractor controller 202 (which may be received from the implement controller 200), the valve assembly 218 may restrict or enable fluid flow from the fluid supply 222 into the respective cylinders 16, 18, 54 via one or more hydraulic lines 216, which may run throughout the vehicle 10 and across to the implement 12. As fluid flows into the cylinders 16, 18, 54, the pressure in the cylinders increases, causing the cylinders to extend. Correspondingly, as fluid flows out of the cylinders 16, 18, 54, the pressure in the cylinders decreases, causing the cylinders to contract. The one or more hitch cylinders 16, 54 and the valve assembly 218 may be collectively referred to as the hitch height actuator. Similarly, the one or more implement cylinders 18 and the valve assembly 218 may be collectively referred to as the implement height actuator.

The implement controller 200 may receive signals indicative of the implement pitch angle from the sensor 20 (e.g., inclinometer). In the illustrated embodiment, the inclinometer 20 may output a signal indicative of the implement pitch angle to the implement controller 200. In other embodiments, the implement pitch angle may be determined using another type of sensor (e.g., gyroscope, sonar, etc.). In further embodiments, the pitch angle may be determined by smart cylinders 18, or skis with angle feedback relative to the implement frame. The implement 12 height may be determined by the implement controller 200 based on the position of the cylinders 18, proximity sensors, sonar, or by some other technique. The implement controller 200 may then execute a program stored in the memory component 206 via the processor 204 to determine whether the implement 12 height and pitch angle are within the desired ranges. If the implement controller 200 determines that the height and/or pitch angle is outside of the desired range, the implement controller 200 may generate a control signal indicative of instructions to control the valve assembly 218, thus extending or contracting the actuators 16, 18, 54, increasing or decreasing the height and/or the pitch angle of the hitch 14 and/or implement 12. The control signal may then be communicated via a communication protocol (e.g., ISOBUS Class 3) to the tractor controller 202, which communicated the control signal to the valve assembly 218 to adjust the actuators 16, 18, 54 (e.g., via the hydraulic lines 216) to achieve the desired implement 12 height and pitch angle.

The implement controller 200 and the tractor controller 202 may communicate via wired or wireless communication. For example, when the implement 12 is coupled to the tractor 10, an ISOBUS Class 3 cable 210 may connect the tractor controller 202 and the implement controller 200, facilitating communication between the implement controller 200 and the tractor controller 202. The ISOBUS Class 3 cable 210 may have a plug 212 that interfaces with a receptacle 214 on the tractor 10. The implement controller 200 may provide information to the tractor controller 202 via the ISOBUS Class 3 cable 210. For example, the implement controller 200 may identify the implement 12 (e.g., by type, model number, serial number, etc.) or otherwise provide information about its operation via the ISOBUS Class 3 cable 210. The implement controller 200 may also communicate command signals to the tractor controller 202 via the ISOBUS Class 3 communication connection. For example, based on the pitch angle of the implement 12, the distance between the hitch 14 or fixed drawbar 50 and the implement wheels, the desired implement pitch angle, and the desired implement height, the implement controller 200 may generate a command signal indicative of instructions to extend or contract the actuators 16, 18, 54 (e.g., via the valve assembly 218) such that the hitch positions an end of the implement proximate to the hitch at a desired height to attain a desired implement pitch angle and/or implement height. In some embodiments, the desired pitch may be parallel to the field over which and the implement is towed. In other embodiments, the desired pitch may be parallel to the tractor 10. In further embodiments, specific non-zero pitch angles may be desired. Similarly, specific desired implement heights may be set for transport (e.g., driving down a road to a field), when the implement 12 is engaged (e.g., in field work), and when the implement 12 is disengaged (e.g., out of field work or for implement service).

Figure 6:
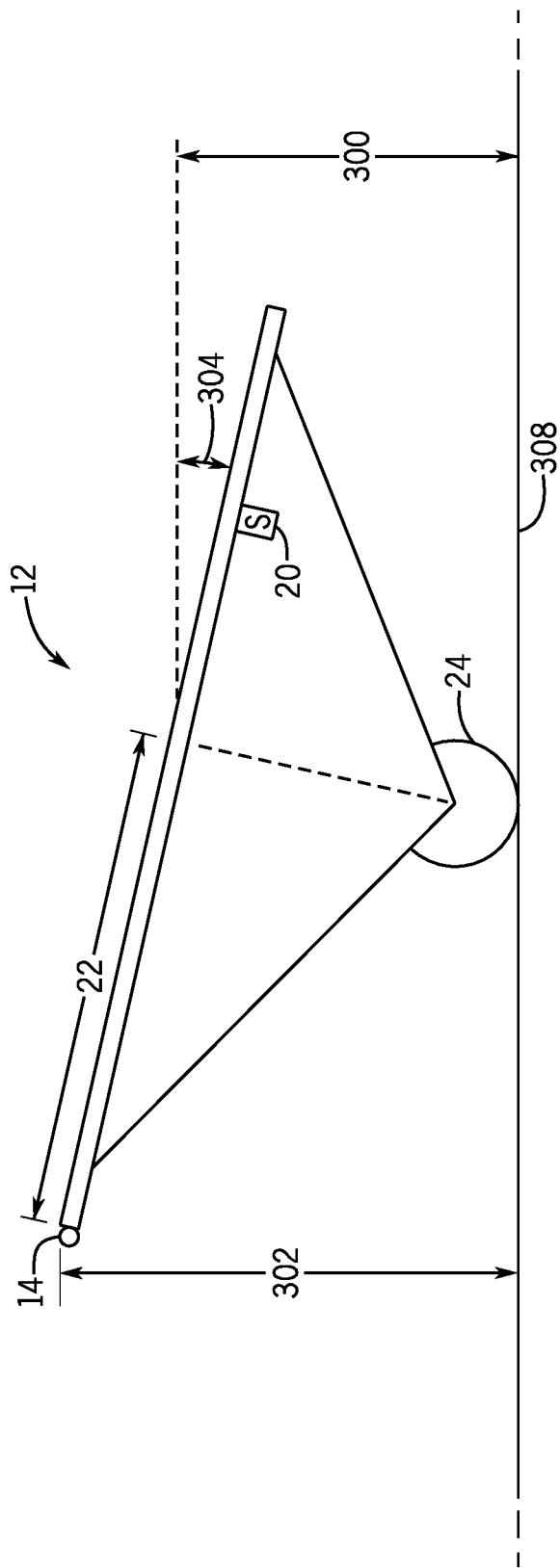
FIG. 6 is a simplified schematic view of one embodiment of the implement, illustrating implement height, hitch height, implement pitch angle, and implement tow length.

FIG. 6 is a simplified schematic view of one embodiment of the implement 12 illustrating implement height 300, hitch height 302, implement pitch angle 304, and implement tow length 22. The implement height 300 may be defined as the vertical distance from the ground 308 (e.g., soil surface) at a point on the implement 12. Though the embodiment illustrated in FIG. 6 shows the implement height 300 as the distance between the ground 308 and a point at the top of the implement 12 directly above the wheels 24, it should be understood that this is merely for illustrative purposes and that the implement height 300 may be determined at any suitable point on the implement 12. The implement height 300 at the rockshaft may be controlled based upon the position of the implement cylinder and/or the position of the hitch cylinder.

The hitch height 302 may be defined as the distance between the ground 308 and a portion of the implement 12 that contacts the hitch 14 (or fixed drawbar) of the tractor 10. As with the implement height 300, the hitch height 302 shown in FIG. 6 is merely for illustrative purposes, and it should be understood that the hitch height 302 may be determined at any suitable point on the tractor or implement 12. The hitch height 302 may be controlled based upon the position of the hitch cylinder.

The implement pitch angle 304 may be defined as the angle of the implement 12 relative to the ground 308 (e.g., ground plane), or relative to the tractor (e.g., horizontal plane through the tractor). Though in the simplified schematic of the implement 12 in FIG. 6, the implement pitch angle 304 is zero, or near zero, when the implement height 300 and the hitch height 302 are equal, it should be understood that in some embodiments, when the implement pitch angle 304 is zero, the implement height 300 and the hitch height 302 may be different values. In the illustrated embodiment, the implement pitch angle 304 may be determined via a sensor 20 (e.g., an inclinometer) mounted on the implement 12. However, the implement pitch angle 304 may be measured by other types of sensors, or determined in some other way via gyroscope, sonar, proximity sensors, smart cylinders, etc.

The tow length 22 may be defined as a longitudinal distance in the implement frame of reference between a point where the hitch 14 (or fixed draw bar) contacts the implement 12 and the implement wheels 24. The tow length 22 may be a known value (e.g., stored in the memory component of the implement controller). In some embodiments, the tow length 22 may be communicated from the implement controller to the tractor controller via the ISO-BUS Class 3 cable. Using the known tow length 22, the measured implement pitch angle 304 and/or the measured implement height 300, the implement controller may determine how much the cylinders should extend or contract to achieve the desired implement height 300 and/or implement pitch angle 304. The implement controller may generate a control signal indicative of instructions to extend or contract the cylinders a determined amount to achieve the desired cylinder positions based on the desired implement pitch angle 304 and implement height 300. The control signal may be communicated to the tractor controller via the ISOBUS Class 3 cable. The tractor controller may then communicate instructions (e.g., via control signals) to the one or more actuators (e.g., valve assembly and cylinders) to extend or contract the cylinders a given amount.

Figure 7:
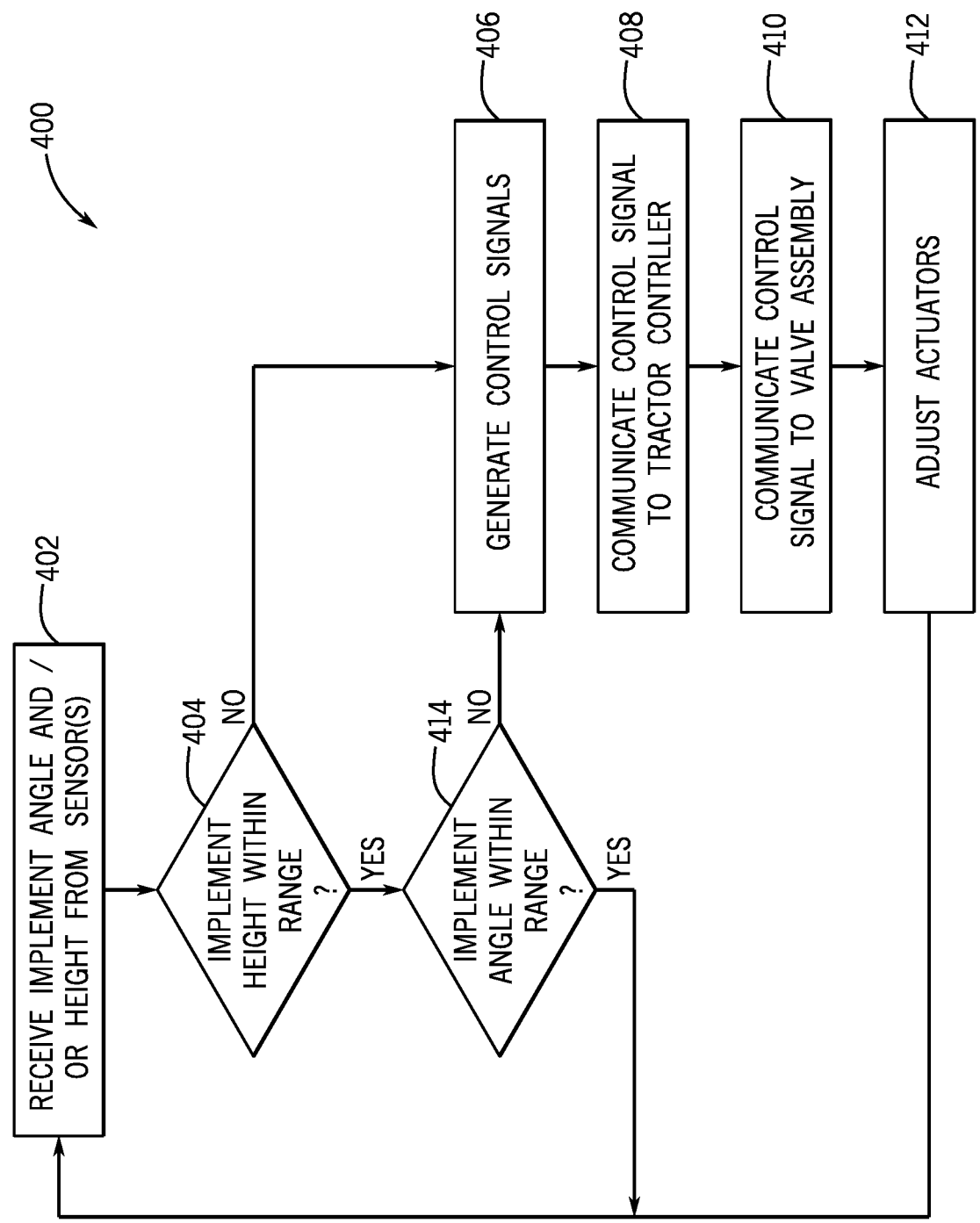
FIG. 7 is a flow chart of an embodiment of a process for leveling an agricultural implement.

FIG. 7 is a flow chart for an embodiment of a process 400 for leveling an agricultural implement. The process 400 may be stored in a non-transitory computer readable medium, such as the memory component (e.g., in the form of code), and executable by the processor. In block 402, the implement pitch angle and/or the implement height, or parameters indicative of the implement pitch angle and/or the implement height, are received (e.g., from one or more sensors). The implement pitch angle and/or implement height may be measured or determined in a variety of ways (e.g., inclinometer, gyroscope, sonar, proximity sensors, smart cylinders, etc.).

In decision block 404, the measured implement height is compared to the desired value or range of values for the implement height. The desired implement height, value, or range of values, may be stored in the memory component along with other implement information. The desired range may be expressed in numbers (e.g., between 46 and 48 inches), or as a desired value with a percentage range (e.g., 48 inches±2%). In some embodiments, there may be a threshold time period before the measured implement height is determined to be outside of the desired range. For example, the measured implement height may not be determined to be outside of the desirable range unless it remains outside of the desirable range for more than a threshold period of time (e.g., 0.5 seconds, 1 second, 1.5 second, 2 seconds, 3 seconds, 4 seconds, 5 seconds, etc.). Use of the threshold time period may help to reduce the possibility of moving the implement in response to noise (e.g., due to rough ground, clods of dirt, divots, etc.).

If the implement height is within the desired range, the process 400 proceeds to block 414 and monitors the implement pitch angle. If the implement height is outside of the desired range, the process 400 proceeds to block 406. In block 406, the process generates an actuator control signal indicative of instructions to extend or contract the hitch and/or implement cylinders to the appropriate position for the desired implement height and implement pitch angle to be attained. The extension or contraction of the implement cylinder may be based at least in part upon the measured implement height, the measured implement pitch angle, the tow length of the implement, and the ratio of cylinder stroke to implement frame height adjustment. Because each of the cylinders may be mounted at angles, and/or coupled by linkages, a length of the cylinder stroke may not result in an equal change in the implement frame height at the wheels. Accordingly, the relationship between the implement cylinder position (e.g., extension/contraction) and the implement frame height at the wheels may be determined. The relationship may be stored as a ratio, a look up table, an equation, etc. Once desired positions of the hitch cylinders and implement cylinders are determined, the control signal is generated indicative of instructions to extend or contract the one or more hitch cylinders and/or implement cylinders the appropriate amount to achieve the cylinder positions that correspond to the desired implement height and implement pitch angle.

In block 408, the control signal is communicated to the tractor controller. In block 410, the control signal is communicated to the valve assembly. In block 412, the actuators are adjusted in accordance with the control signal.

In decision block 414, the measured implement pitch angle is compared to the desired value or range of values for the implement pitch angle. The desired implement pitch angle value or range of values may be stored in the memory component along with other implement information. The desired range may be expressed in numbers (e.g., between −5 degrees and 5 degrees), or as a desired value with a percentage range (e.g., 5 degrees±2%). In some embodiments, the desired implement pitch angle may be zero. In other embodiments, the desired implement pitch angle may be non-zero. In some embodiments, there may be a threshold time period before the measured implement pitch angle is determined to be outside of the desired range. For example, the measured implement pitch angle may not be determined to be outside of the desirable range unless it remains outside of the desirable range for more than a threshold period of time (e.g., 0.5 seconds, 1 second, 1.5 seconds, 2 seconds, 3 seconds, 4 seconds, 5 seconds, etc.). Use of the threshold time period may help to reduce the possibility of moving the implement in response to noise (e.g., due to rough ground, clods of dirt, divots, etc.).

If the implement pitch angle is within the desired range, the process 400 returns to block 402, monitoring the measured implement height and implement pitch angle. If the measured implement pitch angle is outside of the desired range, the process 400 proceeds to the sequence of blocks 406 through 412. As described above, in block 406, an actuator control signal is generated. In block 408, the control signal is communicated to the tractor controller. In block 410, the control signal is communicated to the valve assembly. In block 412, the actuators are adjusted to achieve the designed desired implement height and/or pitch angle.

In some embodiments, the implement height and implement pitch angle may be predictively adjusted. For example, the tractor may be equipped with a sensor to determine the height and pitch angle of the tractor as it traverses an incline or a decline. Based at least in part on the speed of the tractor, the cylinders may be extended or contracted to maintain a desired implement height or implement pitch angle. Similarly, the cylinders may be extended or contracted to maintain a desired implement height or implement pitch angle based on a topographic map of the terrain being covered.

Though presently disclosed embodiments monitor implement pitch angle during operation of the implement, it should be understood that the disclosed techniques may also be used to control the pitch angle of the implement during a transport mode (e.g., while moving on a road) and/or in a service mode (e.g., while the implement is stationary during maintenance, repair, servicing, or component adjustment). Additionally, similar techniques may be used to control the roll angle of the implement.

The disclosed techniques utilize a communication protocol (e.g., ISOBUS class 3) between the implement and the tractor, as well as the sensor mounted to the implement to monitor the implement pitch angle, and communicate a control signal from the implement to the tractor indicative of instructions to adjust the hitch height. By automatically monitoring and maintaining the implement pitch angle at a desired value, the pitch angle of the implement may remain within a desired range during operation of the implement, thus increasing the performance and/or efficiency of the implement during performance of the agricultural task.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
an agricultural implement configured to be coupled to an agricultural vehicle;
a sensor coupled to the agricultural implement and configured to output a signal indicative of a current implement pitch angle of the agricultural implement; and
a control system configured to:
receive the signal indicative of the current implement pitch angle from the sensor;
determine an anticipated implement pitch angle for traversing an upcoming topographical feature;
define an anticipated implement pitch angle range based on the anticipated implement pitch angle;
determine whether the current implement pitch angle is within the anticipated implement pitch angle range;
generate a hitch height control signal indicative of instructions to predictively adjust a hitch height actuator if the current implement pitch angle is not within the anticipated implement pitch angle range; and
communicate the hitch height control signal.

2. The system of claim 1, wherein the control system comprises an implement controller, wherein the implement controller is configured to communicate the hitch height control signal to a tractor controller.

3. The system of claim 1, wherein the agricultural implement comprises a plurality of wheel assemblies, wherein the hitch height control signal is based, at least in part, on the current implement pitch angle, the anticipated implement pitch angle, and a distance between an implement frame and the wheel assemblies of the agricultural implement, and wherein the hitch height control signal is based, at least in part, on a relationship between a hitch height cylinder position and a hitch height.

4. The system of claim 3, comprising an implement height actuator comprising an implement cylinder coupled between one or more of the plurality of wheel assemblies and a frame of the agricultural implement, wherein an implement cylinder position corresponds to an implement frame height.

5. The system of claim 4, wherein the control system is configured to:
determine the implement cylinder position that corresponds to a desired implement height, wherein the desired implement height is determined based on the anticipated implement pitch angle;
generate an implement height control signal indicative of instructions to extend or contract the plurality of implement cylinders to the implement cylinder position; and
communicate the implement height control signal to a valve assembly that restricts or enables fluid flow between a fluid supply and the implement cylinder based at least in part on the implement height control signal.

6. The system of claim 5, wherein the implement height control signal is based, at least in part, on a relationship between the implement cylinder position and the implement frame height.

7. The system of claim 1, wherein the upcoming topographical feature comprises an incline or a decline.

8. The system of claim 1, wherein information regarding the upcoming topographical feature is provided via a topographical map.

9. The system of claim 1, comprising an ISOBUS Class 3 cable configured to plug into a tractor and communicatively couple an implement controller and a tractor controller.

10. The system of claim 1, wherein the sensor comprises an inclinometer.

11. A system, comprising:
an agricultural vehicle, comprising a hitch;
a hitch height actuator configured to adjust a hitch height;
an agricultural implement coupled to the agricultural vehicle via the hitch, wherein the agricultural implement comprises a sensor configured to output a signal indicative of a current implement pitch angle of the agricultural implement; and
a control system configured to:
receive the signal indicative of the current implement pitch angle from the sensor;
determine an anticipated implement pitch angle for traversing an upcoming topographical feature;

define an anticipated implement pitch angle range based on the anticipated implement pitch angle;

determine whether the current implement pitch angle is within the anticipated implement pitch angle range;

generate a hitch height control signal indicative of instructions to predictively adjust the hitch height actuator if the current implement pitch angle is not within the anticipated implement pitch angle range; and communicate the hitch height control signal to the hitch height actuator.

12. The system of claim 11, wherein hitch height actuator comprises a cylinder configured to extend or contract to increase or decrease the hitch height, and a valve assembly configured to restrict or enable fluid flow between a fluid supply and the cylinder, causing the cylinder to extend or contract.

13. The system of claim 12, wherein the control system comprises an implement controller and a tractor controller, wherein the implement controller is configured to communicate the hitch height control signal to the tractor controller, wherein the implement controller is disposed within the implement, the tractor controller is disposed within the tractor, and wherein the implement controller and the tractor controller communicate with one another via an ISOBUS Class 3 communication protocol.

14. The system of claim 13, wherein the agricultural implement comprises:

an implement frame;

a plurality of wheel assemblies; and an implement height actuator configured to adjust an implement height by increasing or decreasing a distance between the implement frame and the wheel assemblies.

15. The system of claim 14, wherein the control system is configured to:

receive a signal indicative of the implement height from the sensor;

determine whether the implement height is within an implement height range;

generate a first and a second control signal indicative of instructions to adjust the hitch height actuator and the implement height actuator, respectively, if the implement height is not within the implement height range;

communicate the first control signal to the hitch height actuator; and communicate the second control signal to the implement height actuator.

16. The system of claim 11, wherein the upcoming topographical feature comprises an incline or a decline.

17. The system of claim 11, wherein information regarding the upcoming topographical feature is provided via a topographical map.

* * * * *